Patented Nov. 12, 1935

2,020,648

UNITED STATES PATENT OFFICE 2,020,648

PRODUCT FOR USE AS GERMICIDE, FUNGICIDE, OR INSECTICIDE

Julius Hyman, Chicago, Ill., assignor to Velsicol Corporation, Chicago, Ill., a corporation of Illinois No Drawing. Application March 14, 1933, Serial No. 660,676

4 Claims. (Cl. 167—22)

The present invention relates more particularly to the manufacture of an oxidized fraction derived from mineral drying oils capable of use in various pharmaceutical preparations as a germicide as well as a fungicide and an insecticide. The invention is also directed to novel steps in the process of manufacturing a product having such properties.

The utility of the present invention, as well as various objects and advantages thereof will be more apparent from the following description:

When unrefined vapor-phase cracked gasoline is treated with fuller's earth, active clay, certain acids such as sulphuric acid, or simply by heat and pressure, in the presence or absence of active catalysts, there is formed a series of heavy boiling and non-volatile polymers possessing high iodine numbers and the property of absorbing oxygen from the air to form petroleum insoluble films.

These polymers may be fractionated, the lightest fractions boiling in the kerosene and light gas oil range possessing the lowest iodine numbers and the least tendency to "dry" by oxidation. These light fractions will, however, absorb oxygen, and in so doing acquire definite germicidal properties. Somewhat elevated temperatures, as, for example, 175° F., as well as the addition of small amounts of the soaps of the siccative metals, such as the linoleates of cobalt, lead or manganese, facilitate greatly this oxygen absorption. An example of the preparation of such a germicide follows:

One hundred parts by weight of a fraction of a polymer derived from vapor-phase cracked gasoline, said fraction boiling in the kerosene and/or gas-oil range, may be mixed with one-half part of manganese linoleate, and the mixture heated until the soap is dissolved. The solution is then blown for six hours at 175° F. with a stream of air sufficient to agitate the mixture very thoroughly. As the oxidation progresses, the solution first becomes darker. Then a precipitate forms and the solution lightens in color. Solvent which has been carried away by the air -current may be condensed and returned to the blowing receptacle. The blowing is discontinued when precipitation appears to have ceased. The solution is then preferably cooled and freed from precipitate by centrifuging or filtering. The filtrate is rich in peroxides, and in soap emulsion possesses a phenol coefficient of around 0.15.

The germicide thus formed may be used in various pharmaceutical preparations as a germicide, as well as a fungicide and an insecticide. In view of the residual gum content, as well as its solvent action, the germicide also finds use as a degreasing agent for metal where it is desired to leave a protective coating on the metal over which lacquer, paint or varnish can be applied.

I claim as my invention:

1. A process of manufacturing oxidized products having organic peroxides, which comprises subjecting a fraction of a polymer derived from vapor-phase cracked gasoline, said fraction boiling in the kerosene and/or gas-oil range to molecular oxygen oxidation in the presence of a siccative metallic soap or soap-forming compound of a siccative metal until precipitation substantially ceases, separating the precipitate and recovering the filtrate.

2. A process such as claimed in claim 1, wherein the oxidation takes place at an elevated temperature.

3. A process such as claimed in claim 1, wherein the oxidation consists in blowing a stream of air through the fraction being oxidized in sufficient amount to thoroughly agitate the fraction.

4. A process of manufacturing oxidized products having organic peroxides, which comprises subjecting a fraction of a polymer derived from vapor phase cracked gasoline, said fraction boiling in the kerosene and/or gas-oil range, to molecular oxygen oxidation by blowing a stream of air through the fraction being oxidized in sufficient amount to thoroughly agitate the fraction, in the presence of a siccative metallic soap or soap-forming compound of a siccative metal, until precipitation substantially ceases, condensing volatile constituents carried away by the air stream, returning said condensate to the blowing receptacle, separating the precipitate and recovering the filtrate.

JULIUS HYMAN.